Oct. 6, 1964    P. K. KINDLING    3,151,825
V-SHAPED CONFIGURATION OF TETHERED BALLOONS
Filed March 14, 1963    2 Sheets-Sheet 1
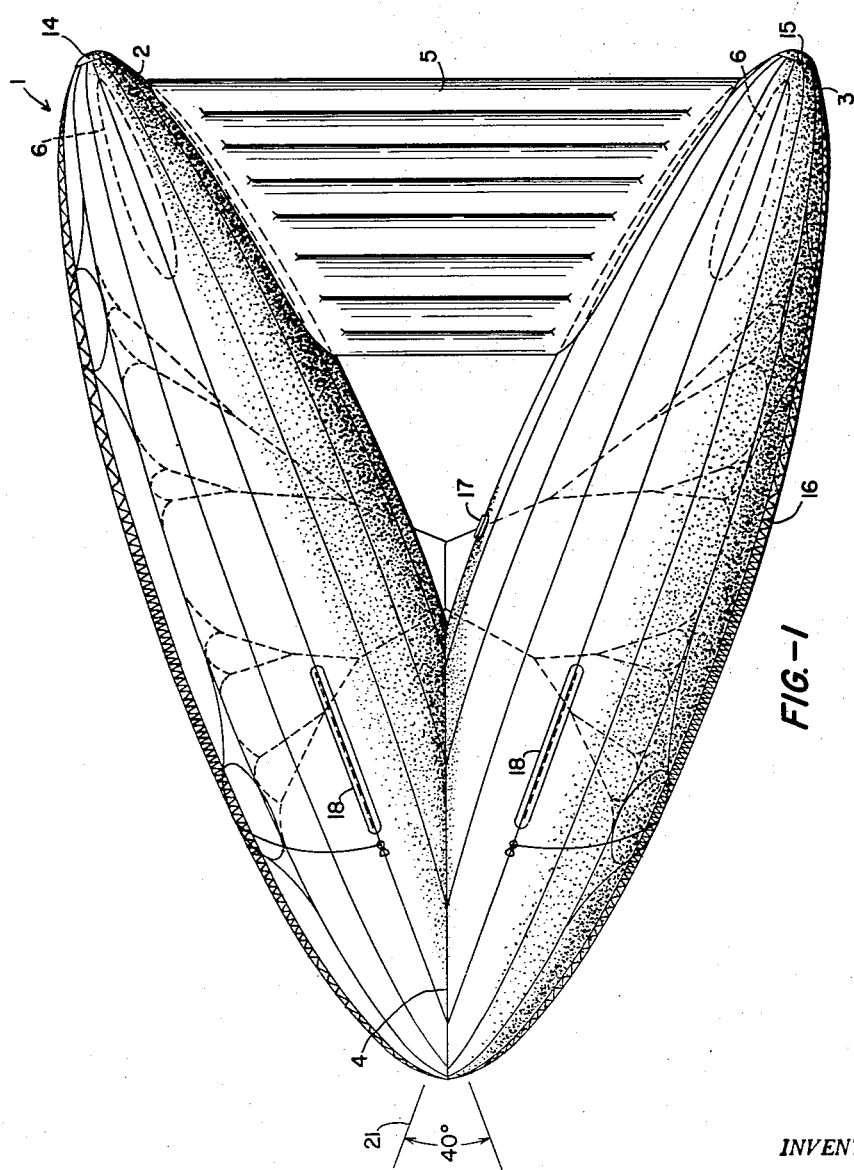
INVENTOR.
PAUL K. KINDLING
BY
ATTORNEY

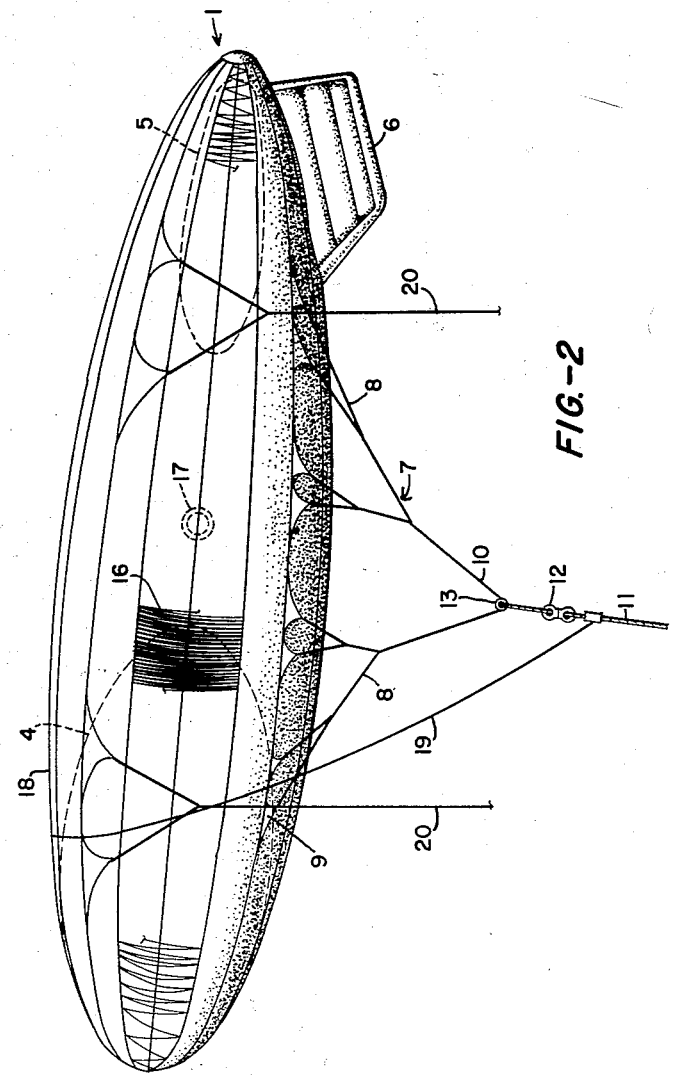

United States Patent Office 3,151,825
Patented Oct. 6, 1964

3,151,825
V-SHAPED CONFIGURATION OF TETHERED BALLOONS
Paul K. Kindling, Wadsworth, Ohio, assignor to Goodyear Aerospace Corporation, a corporation of Delaware
Filed Mar. 14, 1963, Ser. No. 265,153
5 Claims. (Cl. 244—33)

This invention relates to a V-shaped configuration for tethered balloons, and more particularly to a V-shaped configuration to a balloon adapted for lighter than air tethered flight to support an antenna or some desired apparatus.

Heretofore it has been known that there are many and varied types of balloons adapted for tethered flight to hold or support antennas or other apparatus. However, the conventional supporting balloon does not provide continuous and steady stability to the apparatus supported. Also, dependent on the wind situation, the conventional balloon experiences considerable horizontal or downwind displacement during flying supporting operation. Further, in the conventional balloon the relationship of lift to drag ratio on cable tension is not uniform and constant under varying wind conditions, and varying angles of attack.

It is the general object of the invention to avoid and overcome the foregoing and other difficulties of and objections to prior art practices by the provisions of a V-shaped balloon configuration which is sturdy and simple in construction, extremely stable in flight at various angles of attack and in varying wind conditions, and which is low in cost.

Another object of the invention is to provide a V-shaped balloon configuration which provides lighter than air flight to support an antenna or other apparatus, which flies with essentially no horizontal or downwind displacement, and which provides an essentially constant tethered cable tension regardless of the angle of attack.

Another object of the invention is to provide a V-shaped balloon configuration adapted for tethered flight which balloon is readily deflatable, transportable, and easily inflated and launched.

Another object of the invention is to provide a supporting balloon adapted for tethered flight which keeps tethered cable tension to a minimum and still maintains a high lift to drag ratio.

The aforesaid objects of the invention, and other objects which will become apparent as the description proceeds, are achieved by providing in a balloon the combination of a plurality of long inflated bodies joined together at the front and spread to the rear so that the longitudinal center lines of the two outer bodies enclose an acute angle, means operatively connecting the spread rear portions of the bodies and holding the portions in spread relationship, means attached to the balloon to stabilize the directional flight thereof, a bridle suspension system attached to the balloon to effect tethered flight, a tether cable attached to the bridle, and means to provide automatic adjustment of the tether cable angle to maintain the same angle of attack of the balloon under various wind conditions.

For a better understanding of the invention reference should be had to the accompanying drawings, wherein:

FIGURE 1 is a plan view of a balloon comprising one embodiment of the invention; and FIGURE 2 is a side elevation of the balloon shown in FIGURE 1.

Although the principles of the invention are broadly applicable to joining a plurality of long inflated bodies together at their front ends and having them spread to the rear, the invention is usually employed in conjunction with joining two long bodies together at one end in a V-shaped balloon configuration to effect the principles of the invention and hence it has been so illustrated and will be so described.

With specific reference to the form of the invention illustrated in the drawings, the numeral 1 indicates generally a V-shaped balloon comprising a pair of long slender aerodynamically shaped inflatable bodies 2 and 3, which bodies 2 and 3 are joined toegther at their forward ends along a line parallel to the line of flight, and indicated generally by the numeral 4. As more clearly seen in FIGURE 2, the joining point of the sections 2 and 3 forms an elliptical shape, as indicated by the dotted line. Usually, in order to increase the strength of the structure, there will be a perforated partition between the bodies 2 and 3 at the joining point 4.

In order to increase the longitudinal and pitch stability of the V-shaped balloon 1, an inflated horizontal web section 5 bridges the gap between the body tails. The web 5 can be detached on one side or parted in the center to allow the balloon to be threaded on an erected cable. Note also, in FIGURE 2, that the web 5 is located substantially in the middle of the tail sections of the bodies 2 and 3, as indicated by the dotted line. The web 5 could take a variety of forms to accomplish its structural purpose which essentially is to stabilize the balloon longitudinally, and to operatively connect the tail portions of the bodies 2 and 3 to hold the tail portions in properly spread relationship.

In order to increase directional stability, a pair of vertically directed fins 6 are mounted downwardly on the after tail section of the bodies 2 and 3. Usually, these fins 6 are aligned parallel to the direction of flight, or parallel to the center line of the hull as indicated by the dotted lines of FIGURE 1, and are normally made from inflated webs similar to the longitudinal supporting web 5.

In order to tether the balloon, a cable bridle system indicated generally by the numeral 7 is provided, which comprises a plurality of cables 8 connecting from webbed attachment points 9 on the bodies 2 and 3, and which connect from fore and aft to a V-shaped bridle 10, which bridle 10 lies essentially parallel to the line of flight of the balloon 1. A tethering cable 11 connects through a swivel joint 12 to a pulley 13, which pulley 13 rides on the V-shaped bridle 10. This arrangement provides that the balloon 1 will maintain the same angle of attack in relation to the wind, regardless of movement of the cable 11, and that the balloon 1 can change the angle of attack depending on the wind situation, without varying the angle of the cable 11. The bridle and cable support system 7 are shown in dotted lines in FIGURE 1.

The physical construction of the bodies 2 and 3 is similar to the construction of conventional lighter than air balloons. Inflation sleeves 14 and 15 are provided on the tails of the bodies 2 and 3 respectively to provide inflation means. A standard dilation system, indicated generally by the numeral 16 is provided to properly control the balloon pressure at varying altitudes. A pressure relief valve 17 is provided to insure that the bodies will not rupture if the dilation system does not function properly. Rip panels 18 are provided to very quickly deflate the balloon if it breaks away on the ground or breaks the swivel 12 while in flight. A safety line 19 runs from the tether cable 11 to the rip panels 18 to mechanically operate the rip panels if the swivel 12 containing the weak link does give way. A plurality of ground handling lines 20 connected to webs on the bodies are provided to tie the balloon down when not in use and to facilitate launching.

In the embodiment of the invention shown in the drawings, the bodies 2 and 3 are designed to be approximately 100 feet long and 25 feet in diameter with a spread at their rear portions of about 70 feet. This provides an acute angle of approximately 40 degrees, indicated at 21, between the longitudinal center lines of the bodies 2 and 3. It was found under extensive testing at varying wind conditions, that this V balloon configuration provided increased lateral stability against yawing action, as well as a virtual elimination to any horizontal or downwind displacement by the balloon from the tether point. In tethered balloons, designed for antenna support or apparatus support, the optimum requirements usually are that the balloon remain vertically above the stationary tether point, and maintain a minimum, yet a constant, tether cable tension. When supporting an antenna, the receiving or sending properties and characteristics of the antenna can be greatly altered by varying the antenna from the vertical position, and also by varying the tension placed on the antenna. The tethered balloon configuration has proved under testing to maintain a high degree of stability during flight, a high lift drag ratio at small angles of attack, regardless of wind conditions, and tends to fly with a minimum of downward displacement above the tethered point thereby greatly reducing the catenary in the tether cable.

A further advantage to a V balloon configuration of this size is that it can be easily deflated and packaged, and thereby becomes a mobile package system which is transportable. Once the balloon is at the desired location it can easily be inflated, and because of its great length but small height, it is easily manageable on the ground even under high wind conditions, and can be quickly and easily launched using the ground handling lines.

Because of the V-shape to the balloon, it is possible to have the center open to enable a tether cable to pass from below to above without interference when using the balloon in a multiple balloon system. This greatly simplifies the structural requirements necessary in a multiple balloon system.

The bodies comprising the balloon may be of cylindrical, conical or aerodynamical shape, and can join each other at an acute angle of any desired degree, but generally falling between 30 to 60 degrees. The horizontal web operatively connecting the tailed portions of the bodies can be inflated or rigidized in any suitable manner in order to provide the longitudinal stability and strengthening features required. In order to further increase directional stability an incease in the number of vertical surfaces could be provided at various locations. The freedom of movement of the pulley in the V-shaped bridle attachment to the balloon is limited to prevent excessive movement of the balloon if wind conditions are unusually rough.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a balloon the combination of two elongated inflated bodies joined together at the front and spread to the rear so that the longitudinal center lines of the two bodies enclose an acute angle, means having a large flat surface lying substantially in a plane containing the longitudinal center lines of the bodies operatively connecting the spread rear portions of the bodies to provide pitch stability to the balloon and holding said portions in spread relationship, and means attached to the balloon to stabilize the directional flight thereof.

2. In a balloon adapted for tethered flight the combination of a plurality of aerodynamically shaped bodies joined together at the front and spread outwardly to the rear so that the longitudinal center lines of the two outer bodies enclose an acute angle of 30 to 60 degrees, inflated web means operatively connecting the spread rear portions of the bodies and holding said portions in spread relationship, vertically directed inflated web means attached to the bodies to stabilize the directional flight of the balloon, a bridle suspension system attached to the balloon to effect tethered flight, a tether cable attached to the bridle, and means to provide automatic adjustment of the tethered cable angle to maintain the same angle of attack of the balloon under various wind conditions.

3. In a balloon adapted for tethered lighter than air flight the combination of two long inflated aerodynamically shaped bodies joined together at the front and spread outwardly to the rear so that the longitudinal center lines of the bodies enclose an acute angle of 40 degrees, inflated web means operatively connecting the spread rear portions of the bodies and holding said portions in spread relationship, said web effecting longitudinal stability to the balloon, inflated vertically directed web means attached to the bodies to stabilize the directional flight of the balloon, a bridle suspension system attached to the balloon to effect tethered flight thereof, a tether cable attached to the bridle suspension system, means to provide automatic adjustment of the tether cable angle in relation to the bridle suspension system to maintain the same angle of attack of the balloon in relation to the wind under varying wind conditions, dilation means in the bodies to effect proper pressure to the bodies at varying altitudes, rip panel means in the bodies to effect rapid deflation thereof, and pressure relief means on the bodies to release pressure at a preset amount to prevent rupture of the bodies.

4. In a balloon adapted for tethered lighter than air flight the combination of two long inflated aerodynamically shaped bodies joined together at the front and spread outwardly to the rear so that the longitudinal center lines of the bodies enclose an acute angle and lie in a common plane, means operatively connecting the spread rear portions of the bodies and holding said portions in spread relationship said means having a large surface for effecting longitudinal and pitch stability to the balloon, means attached to the bodies to stabilize the directional flight of the balloon, and a bridle suspension system attached to the balloon to effect tethered flight thereof.

5. In a balloon the combination of two elongated inflated bodies joined together along a substantial front portion thereof to define a substantial elliptical shape at the plane of joining and spread to the rear so that the longitudinal center lines of the two bodies enclose an acute angle, a perforated partition between the joined front portions of the bodies and operatively connected thereto, inflated means having substantial width in longitudinal relation to the bodies operatively connecting the spread rear portions of the bodies to stabilize the longitudinal flight and pitch thereof while holding said portions in spread relationship, inflated means attached to the balloon to stabilize the directional flight thereof, a bridle suspension system attached to the balloon to effect tethered flight, a tether cable attached to the bridle, and means to provide automatic adjustment of the tether cable angle to maintain the same angle of attack of the balloon under various wind conditions.

References Cited in the file of this patent

UNITED STATES PATENTS

| 1,833,033 | Ortega | Nov. 24, 1931 |
| 2,329,002 | Schoettel | Sept. 7, 1943 |
| 2,823,876 | Ebnetter | Feb. 18, 1958 |
| 3,093,354 | Pohl | June 11, 1963 |

FOREIGN PATENTS

| 16,348 | Great Britain | 1901 |
| 146,852 | Great Britain | July 14, 1921 |